United States Patent [19]

Hayashi et al.

[11] Patent Number: 5,363,138
[45] Date of Patent: Nov. 8, 1994

[54] IMAGE SIGNAL REPRODUCING APPARATUS FOR PARTIALLY REPRODUCING IMAGE TO BE DISPLAYED

[75] Inventors: Junji Hayashi; Hiroyuki Matsukawa, both of Tokyo, Japan

[73] Assignee: Fuji Photo Film Co., Ltd., Ashigara, Japan

[21] Appl. No.: 968,352

[22] Filed: Oct. 29, 1992

[30] Foreign Application Priority Data

Oct. 30, 1991 [JP] Japan .................. 3-310113

[51] Int. Cl.⁵ .......................................... H04N 7/130
[52] U.S. Cl. ...................................... 348/390; 348/718
[58] Field of Search ............... 358/133, 136; 348/384, 348/390, 718, 715

[56] References Cited

U.S. PATENT DOCUMENTS

| | | | |
|---|---|---|---|
| 4,930,014 | 5/1990 | Maeda et al. | 348/384 |
| 4,985,768 | 1/1991 | Sugiyama | 358/136 |
| 5,089,884 | 2/1992 | Suzuki et al. | 358/133 |
| 5,124,790 | 6/1992 | Nakayama | 348/384 |
| 5,126,842 | 6/1992 | Andrews et al. | 358/133 |
| 5,187,755 | 2/1993 | Aragaki | 348/384 |
| 5,198,900 | 3/1993 | Tsukagoshi | 358/133 |
| 5,216,712 | 6/1993 | Shimoda et al. | 358/133 |
| 5,227,875 | 7/1993 | Suu et al. | 348/384 |

Primary Examiner—Tommy P. Chin
Assistant Examiner—Richard Lee
Attorney, Agent, or Firm—Birch, Stewart, Kolasch & Birch

[57] ABSTRACT

Compressed image data received by a receiving circuit 11 is stored once in a buffer memory 12. When the quantity of the compressed image data in the buffer memory 12 reaches a predetermined quantity (for example, a quantity corresponding to one-fourth of compressed image data corresponding to one frame), the compressed image data is read out and is applied to an expanding circuit 13 to perform data expansion processing and then, the expanded image data is displayed on a monitor display device 18 through a video demodulating circuit 14. The above-mentioned operations are repeated, to sequentially display an image which is near completion. Consequently, an image can be partially reproduced and displayed even while the compressed image data is being received.

3 Claims, 3 Drawing Sheets

IMAGE SIGNAL REPRODUCING APPARATUS FOR PARTIALLY REPRODUCING IMAGE TO BE DISPLAYED

BACKGROUND OF THE INVENTION

1. Field of the Invention

The present invention relates generally to an image reproducing apparatus and method, and more particularly, to an apparatus for and a method of reproducing digital image data transmitted through a transmission line.

2. Description of the Related Art

Image data is handled after being subjected to data compression processing in many cases because the quantity thereof is significantly large. In a system for transmitting compressed digital image data through a transmission line with a relatively low speed such as a digital public network, it is necessary to wait, so as to reproduce and display compressed image data received on the receiving side, for the completion of the receiving of the whole compressed image data. The quantity of the image data is relatively large even if the image data is subjected to data compression, as described above. Accordingly, it takes a very long time (for example, not less than 10 seconds) to complete the receiving of the whole image data, particularly when the transmission speed is low. A receiving person feels the waiting time very long.

Therefore, a method of reproducing and displaying, during the receiving of image data, only a received part of the image data is considered. Examples of this method include 1) a method of first transmitting only a DC component of image data to first display a rough image represented by the DC component, 2) a method of first transmitting data representing upper bits of image data which is not compressed to first display a rough image represented by upper bits, and the like.

However, the following problems arise in the above-mentioned methods. That is, in the method 1), the compression rate of the image data cannot be increased. In the method 2), the image data cannot be compressed. In either method, therefore, although a rough image can be displayed during the receiving of the image data, it takes still longer to complete the receiving of the whole image data.

SUMMARY OF THE INVENTION

An object of the present invention is to allow the realization of a high compression rate, thereby to complete the transmission of image data in a relatively short time as well as sequentially reproduce and display received image data one part thereof at a time so that the quality of a displayed image is gradually improved with time.

An image reproducing apparatus according to the present invention comprises receiving means for receiving transmitted compressed image data formed by dividing digital image data constituting one frame into a plurality of blocks and subjecting the digital image data to data compression processing for each block, temporary storing means for temporarily storing the compressed image data; means for sequentially writing a predetermined quantity the compressed image data received by the receiving means into the temporary storing means a predetermined quantity which is not less than a quantity; reading and expanding means for sequentially reading out the predetermined quantity of compressed image data written in the temporary storing means and subjecting the compressed image data to data expansion processing, and signal converting means for converting the expanded image data into a video signal in a form suitable for display and outputting the video signal.

In accordance with another aspect, an image reproducing apparatus according to the present invention comprises receiving means for: receiving transmitted, compressed image data formed by dividing digital image data constituting one frame into a plurality of blocks and subjecting the digital image data to data compression processing for each block temporary storing means for temporarily storing the compressed image data; image data expanding means for subjecting the compressed image data to data expansion processing; signal converting means for converting the expanded image data into a video signal in a form suitable for display and outputting the video signal; and means for carrying out such control as to write the compressed image data received by the receiving means to the temporary storing means, read out the compressed image data from the temporary storing means after compressed image data in a predetermined quantity which is not less than a quantity corresponding to the above-mentioned one block is written in the temporary storing means, apply the compressed image data read out of the temporary storing means to the image data expanding means to expand the compressed image data constituting one frame a plurality of times by performing the expansion processing, and convert the compressed image data into the above-mentioned video signal by the signal converting means and output the video signal.

In accordance with still another aspect, an image reproducing apparatus according to the present invention comprises: storing means for sequentially temporarily storing compressed image data which has been formed by dividing digital image data constituting one frame into a plurality of blocks and subjecting the digital image data to data compression processing for each block, every time the compressed image data is inputted; image data expanding means for reading out the compressed image data from the storing means after the quantity, of the compressed image data stored in the storing means reaches a predetermined quantity, which quantity is not less than a quantity corresponding to the one block and subjecting the compressed image data to data expansion processing; and signal converting means for converting the image data subjected to the expansion processing into a video signal in a form suitable for display and outputting the video signal.

The image reproducing apparatus can be further provided with a display device for displaying an image represented by the video signal outputted from the signal converting means.

An image reproducing method according to the present invention comprises the steps of receiving transmitted compressed image data formed by dividing digital image data constituting one frame into a plurality of blocks and subjecting the digital image data to compression processing for each block; sequentially writing the predetermined quantity compressed image data received to temporary storing means which quantity is not less than a quantity corresponding to the above-mentioned one block sequentially reading out the predetermined quantity of compressed image data written in the temporary storing means and subjecting the compressed image data to data expansion processing; and converting the expanded image data into a video signal in a form suitable for display and outputting the video signal, to complete an image displayed on the basis of the video signal in a plurality of stages.

The image reproducing apparatus and method according to the present invention covers compressed image data formed by dividing digital image data constituting one frame into a plurality of blocks and subjecting the digital image data to compression processing for each block. Since such compressed image data is subjected to data compression processing for each block, it can be subjected to data expansion processing for each block.

The compressed image data received is temporarily stored until compressed image data corresponding to one block or a plurality of blocks are received, and then the compressed image data temporarily stored is subjected to expansion processing, thereby to make it possible to partially reproduce an image. The compressed image data is thus subjected to reproduction processing a predetermined quantity at a time, thereby to gradually complete a reproduced image while receiving the compressed image data.

As described in the foregoing, according to the present invention, an image can be partially reproduced and displayed even while the compressed image data is being received. Accordingly, a receiving person is not bored while waiting until an entire high resolution image is received before an image is displayed. Moreover, the image data is subjected to data compression and data expansion processing for each block, thereby to make it possible to raise the compression rate and make the transmission time of the compressed image data relatively short.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the present invention, digital data representing a color image shall comprise luminance data Y and color difference data Cr and Cb. Each of the image data is composed of, for example, 8 bits per one pixel (one dot).

The image data, that is, the luminance data Y and the color difference data Cr and Cb are separately subjected to data compression processing. The compressed image data Y, Cr and Cb are arranged in this order in a frame sequential manner, and are transmitted in this order through a digital network. The compressed image data received Y, Cr and Cb are separately subjected to data expansion processing (for each block as described later).

Figure 3:
FIG. 3 illustrates an example of an image transmitted.

One example of an image represented by image data transmitted from the transmission side is illustrated in FIG. 3.

Figure 4A:
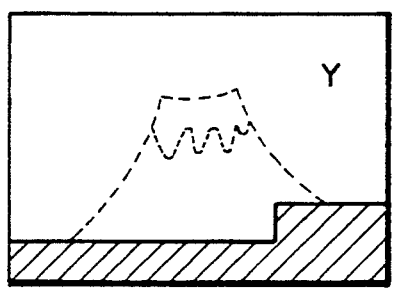
FIGS. 4a to 4d show examples of an image received and sequentially reproduced and displayed.

In the embodiment of the present invention, the whole quantity of the compressed image data received and comprising the luminance data Y and the color difference data Cr and Cb is divided into four equal parts. First, a first one-fourth of the compressed image data is received and then, the first one-fourth of the image data received is expanded, reproduced and displayed. An example of this display is illustrated in FIG. 4a. A part of the luminance data Y is reproduced and displayed. A portion indicated by oblique hatching is a portion where even the luminance data Y is not received.

Figure 4B:
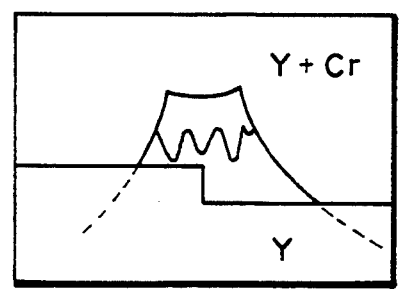

After the second one-fourth of the compressed image data is received, the second one-fourth of the image data received is expanded, reproduced and displayed. An example of this display is illustrated in FIG. 4b. The whole of the luminance data Y and a part of the color difference data Cr are reproduced.

Figure 4C:
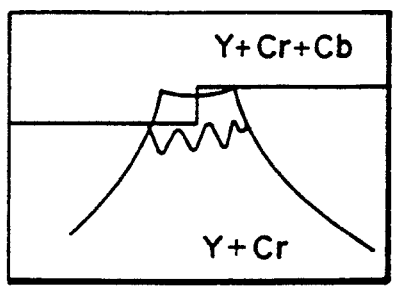

After the third one-fourth of the compressed image data is received, the third one-fourth of the image data received is expanded, reproduced and displayed. An example of this display is illustrated in FIG. 4c. The whole of the luminance data Y and the whole of the color difference data Cr as well as a part of the color difference data Cb are reproduced.

Figure 4D:
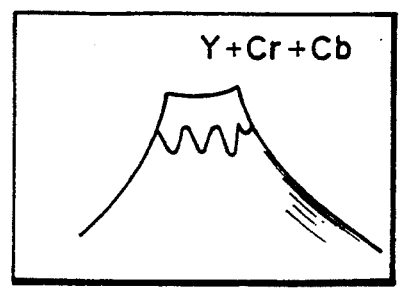

When the receiving of the last one-fourth of the compressed image data is completed, the last one-fourth of the compressed image data received is expanded, reproduced and displayed. An example of this display is illustrated in FIG. 4d. The reproduction of all the image data Y, Cr and Cb is terminated, to complete a reproduced image.

On the transmission side, the image data after compression processing may be transmitted in the above-mentioned one-fourth compressed image data order. In order to make the transmission time as short as possible, however, it is preferable to continuously transmit the whole compressed image data. In the present embodiment, the whole compressed image data shall be continuously transmitted.

The two-dimensional orthogonal transform coding method is used in the present embodiment so as to compress the image data. The respective image data Y, Cr and Cb are subjected to exactly the same compression processing (they reasonably use parameters having different values in the compression processing) and hence, only one type of image data, for example, the luminance data Y will be described.

The image data is divided into a plurality of blocks. For example, one block is composed of 8 dots×8 dots. Image data in each of the blocks is subjected to a two-dimensional orthogonal transformation (for example, a two-dimensional discrete cosine transformation=DCT). The data subjected to the orthogonal transformation is normalized using a predetermined normalizing factor (the data is divided using the normalizing factor), and data having a value smaller than this normalizing factor is rounded down to zero (quantization processing). The thus quantized data is encoded into a Huffman code.

Expansion processing of the compressed image data is performed in the procedure reverse to the above-mentioned procedure. More specifically, the compressed image data is first decoded and, subsequently, is subjected to a two-dimensional orthogonal reverse transformation. Finally, image data expanded for each block are synthesized (arranged) on a memory so as to constitute one frame.

Figure 1:
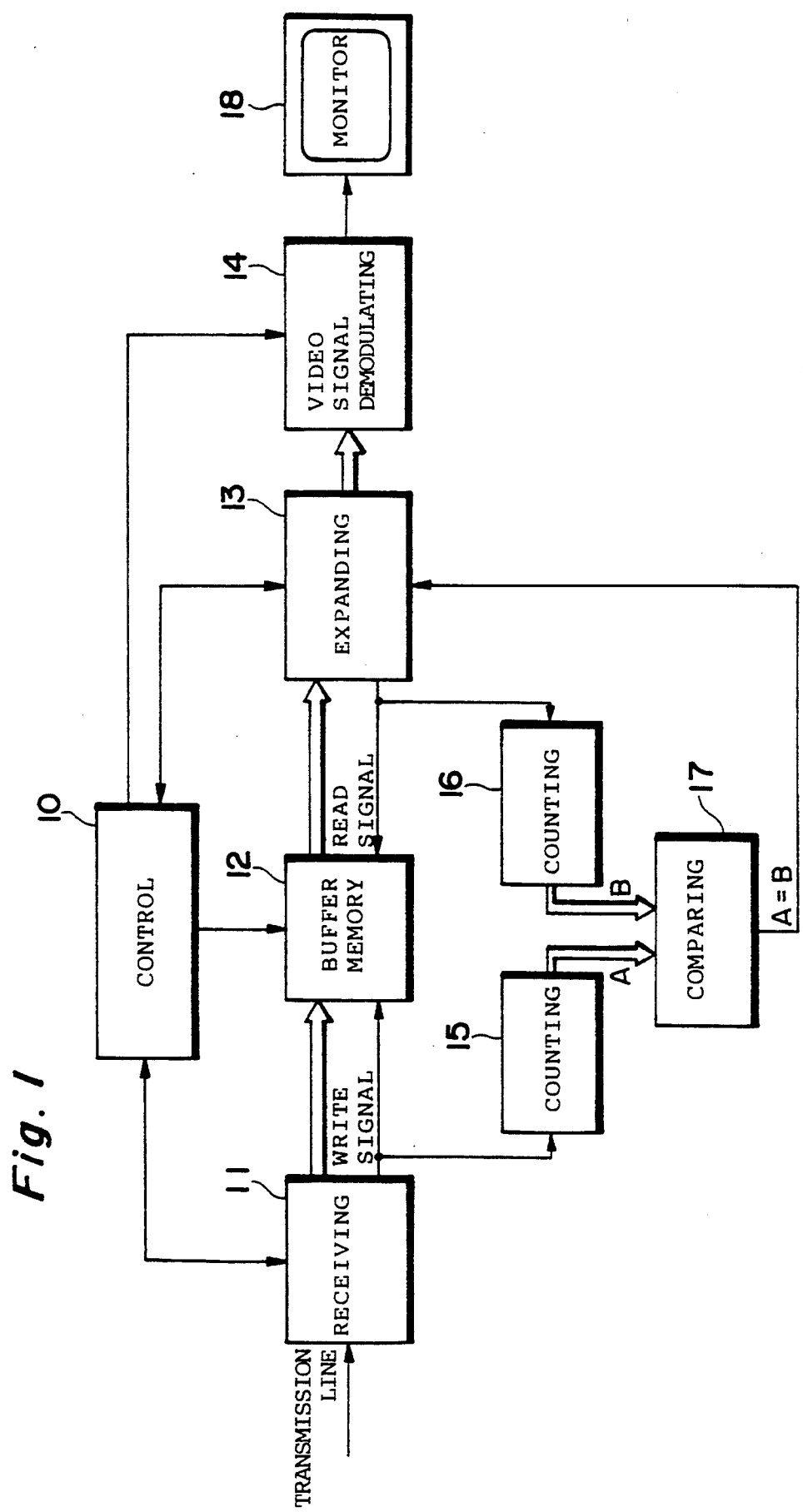
FIG. 1 is a block diagram illustrating the construction of an image reproducing apparatus.
Figure 2:
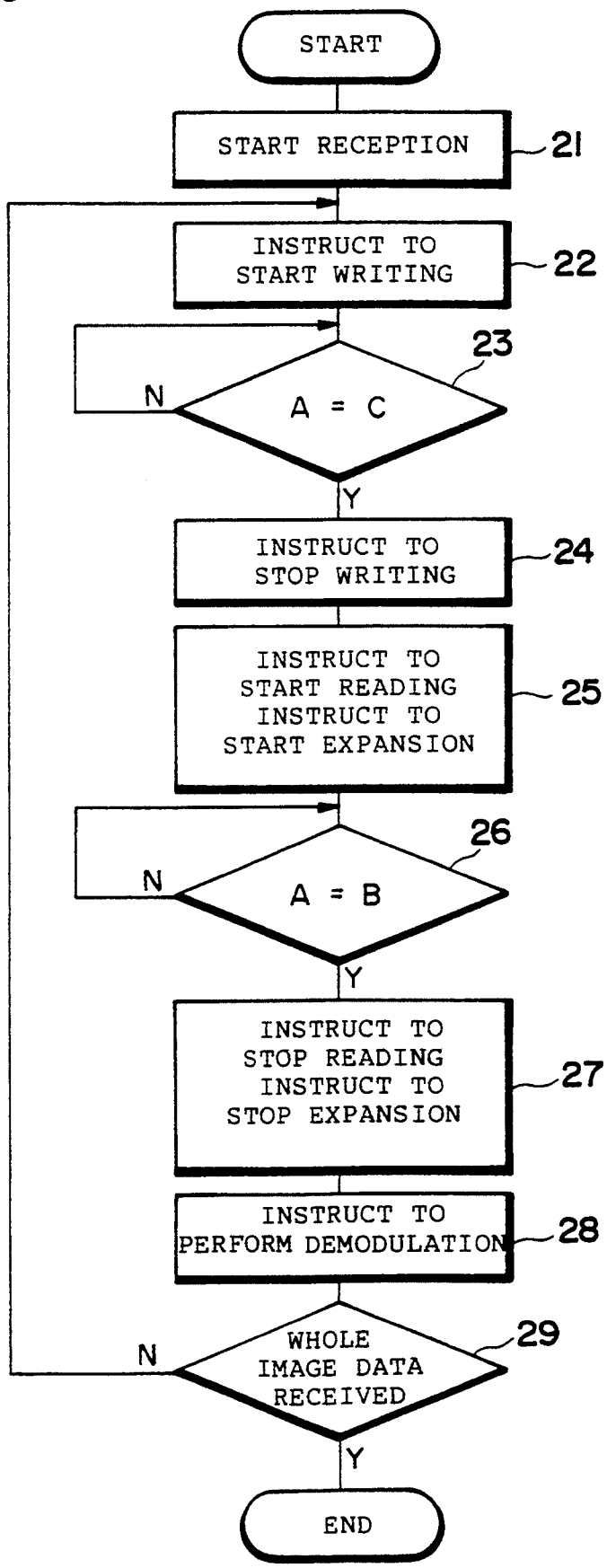
FIG. 2 is a flow chart mainly showing the procedure for processing of a control portion in the image reproducing apparatus.

FIG. 1 illustrates the electrical construction of an image reproducing apparatus according to an embodiment of the present invention. FIG. 2 shows the procedure for processing in a control portion 10 shown in FIG. 1.

Referring to FIGS. 1 and 2, the image reproducing apparatus has a function of receiving compressed image data transmitted through a transmission line such as a digital network, and comprises a receiving portion (receiving circuit) 11 so as to achieve this receiving function. The receiving portion 11 is connected to the transmission line. The receiving portion 11 comprises a circuit for converting the compressed image data serially transmitted into parallel data (for example, 8-bit data), a receiving buffer for temporarily storing the compressed image data received, and the like. The receiving buffer may store serial data or parallel data obtained by the conversion.

The image reproducing apparatus further comprises a buffer memory 12 for temporarily storing each of the above-mentioned one-fourth data of the compressed image data of one frame, an expanding portion (expanding circuit) 13 for performing the above-mentioned expansion processing of the compressed image data, and a video signal demodulating portion (demodulating circuit) 14 for converting the expanded image data into a video signal suitable for display. The expanding portion 13 comprises a frame memory for storing the expanded image data. The demodulating circuit 14 comprises a circuit for converting luminance data Y and color difference data Cr and Cb applied from the expanding portion 13 into color component data R, G and B, a circuit for making gray level correction or gray scale modification, a digital-to-analog converting circuit for converting digital image data into an analog video signal, and the like.

The receiving portion 11, the buffer memory 12, the expanding portion 13, and the demodulating portion 14 are controlled by a control portion ( control unit ) 10. The control portion 10 is preferably constituted by a microprocessor and its peripheral circuits.

In order to write to the buffer memory 12 the compressed image data is received in the receiving portion 11 and converted into parallel data, and a write signal is applied to the buffer memory 12 from the receiving portion 11. On the other hand, in order to read out the compressed image data stored in the buffer memory 12, a read signal is applied from the expanding portion 13. A write signal or a read signal is generated every time 1-byte of data is to be written or read out. A counting portion (counter) 15 is provided so as to count the quantity of the compressed image data written to the buffer memory 12. The counting portion 15 counts the number of write signals, thereby to output a signal A representing the quantity of data written to the buffer memory 12. Similarly, a counting portion (counter) 16 is provided so as to count the quantity of the compressed image data read out from the buffer memory 12. The counting portion 16 counts the number of read signals, thereby to output a signal B representing the quantity of data read out from the buffer memory 12. The signals A and B are compared with each other in a comparing circuit 17. A coincidence signal is generated from the comparing circuit 17 when the quantities of the data represented by both the signals A and B coincide with each other, and is inputted to the control portion 10 through the expanding portion 13.

A monitor display device 18 to which the video signal outputted from the demodulating portion 14 is applied is connected to the image reproducing apparatus. This display device may be included in the image reproducing apparatus or may be externally connected.

The operation of the control portion 10 in controlling the operation of the image reproducing apparatus will now be described with regard to the apparatus of FIG. 1 and the steps of FIG. 2.

When the receiving portion 11 receives compressed digital image data sent through the transmission line, a signal indicating that the receiving has been started is applied to the control portion 10 (step 21). A header in the received data includes data representing the quantity of the compressed image data transmitted (the compressed image data transmitted is generally of variable-length). The data is applied to the control portion 10, so that the control portion 10 can know the quantity of compressed image data constituting one frame. The control portion 10 divides the quantity of the data by four, to calculate the quantity of one-fourth data of the compressed image data constituting one frame. Let C be the quantity of the one-fourth data. The control portion 10 instructs the receiving portion 11 and the buffer memory 12 to write the compressed image data received to the buffer memory 12 when the receiving of the compressed image data is started in the receiving portion 11 (step 22). Consequently, the compressed image data stored in the receiving buffer in the receiving portion 11 is sequentially written to the buffer memory 12. The quantity of the compressed image data written in the buffer memory 12 is counted by the counting portion 15. A counted value A is given to the control portion 10. The control portion 10 can also determine the quantity of data written in the buffer memory 12 on the basis of the signal from the receiving portion 11 independently of the counting in the counting portion 15.

In either case, when the quantity of data written in the buffer memory 12 is equal to the quantity C which is one-fourth of the quantity of the whole compressed image data constituting one frame (step 23), the control portion 10 instructs the receiving portion 11 and the buffer memory 12 to stop writing (step 24). Subsequently, the control portion 10 instructs the buffer memory 12 and the expanding portion 13 to start reading and expansion processing (step 25) respectively. Consequently, the compressed image data stored in the buffer memory 12 is read out and is applied to the expanding portion 13. Accordingly, in the expanding portion 13, expansion processing of the compressed image data is performed. The quantity of the image data read out from the buffer memory 12 is counted by the counting portion 16. The receiving portion 11 receives the compressed image data transmitted during this counting, in order to store the received data in the receiving buffer.

When a counted value B counted by the counting portion 16 coincides with the counted value A previously counted by the counting portion 15 (step 26), a coincidence signal is outputted from the comparing circuit 17 and is applied to the control portion 10. The control portion 10 is responsive thereto for instructing the buffer memory 12 and the expanding portion 13 to stop reading as well as instructing the expanding portion 13 to stop expansion processing (step 27). In addition, both the counting portions 15 and 16 are cleared.

Thereafter, the control portion 10 instructs the demodulating portion 14 to perform demodulation. Accordingly, the image data expanded in the expanding portion 13 and stored in the frame memory therein is demodulated in the demodulating portion 14 and is applied to the monitor display device 18. Consequently, an incomplete image represented by the one-fourth image data of the image data constituting one frame as shown in FIG. 4a is displayed on the display device 18.

The above described operations in the steps 22 to 28 are repeatedly performed in sequence with respect to the whole compressed image data received constituting one frame of the one-fourth compressed data thereof at a time (step 29). As shown in FIGS. 4b and 4c, therefore, an image which becomes nearer to completion with each repetition is sequentially displayed on the display device 18. If a final series of processing (processing in the steps 22 to 28) is terminated, a complete image is displayed, as shown in FIG. 4d.

In the above described embodiment, the compressed image data is separately written to and read out from the buffer memory 12. If the buffer memory 12 can simultaneously write and read out data, the compressed image data may be simultaneously written and read out. Since the speed of reading is generally higher than the speed of writing, the reading of data will be started after a suitable quantity of data (which is not more than the quantity C) is stored in the memory 12. In this case, the above-mentioned predetermined quantity C will be inputted to the comparing circuit 17 in place of the counted value A of the counting portion 15. The buffer memory 12 may be omitted to directly apply the compressed image data stored in the receiving buffer in the receiving portion 11 to the expanding portion 13 in some instances. When the quantity of the data applied to the expanding portion 13 becomes the predetermined quantity C, the expanding portion 13 interrupts expansion processing to apply the expanded image data to the demodulating portion 14. Another frame memory for holding the image data expanded in the expanding portion 13 for display may be provided as required. Although in the above-mentioned embodiment, the compressed image data constituting one frame is expanded and displayed in a quantity which is one-fourth of the quantity of the compressed image data constituting one frame at a time, it can be reproduced in arbitrary quantity increments such as one-eighth thereof at a time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image signal reproducing apparatus which partially reproduces an image to be displayed to complete one frame of an image displayed in a plurality of stages while receiving compressed image data comprising:

receiving means for receiving the compressed image data from a transmitter process;

temporary storing means for temporarily storing the compressed image data;

write control means for writing the compressed image data received by said receiving means to said temporary storing means by a prescribed amount of compressed image data to be displayed in one stage of said plurality of stages;

image data expanding means for reading the compressed image data from said temporary storing means, and for subjecting the compressed and read image data to data expansion processing;

counting means for counting an amount of compressed image data read from said temporary storing means by said image data expanding means;

comparing means for comparing the amount of compressed image data counted by said counting means with said prescribed amount of compressed image data to be displayed in said one stage, and for outputting a coincidence signal when the count amount reaches said prescribed amount to stop said image data expanding means from data expansion processing; and reproducing means, which starts reproducing processing in response to said coincidence signal, for converting the image data expanded by said image data expanding means into a video signal in a form suitable for displaying, and for outputting the video signal.

2. The image reproducing apparatus according to claim 1, further comprising:

a display device for displaying an image represented by the video signal outputted from said reproducing means.

3. An image signal reproducing method for partially reproducing an image to be displayed to complete one frame of an image displayed in a plurality of stages while receiving compressed image data comprising the steps of:

(a) receiving the compressed image data from a transmitter process;

(b) temporarily storing the compressed image data;

(c) carrying out write control by writing the compressed image data to said temporary storing step by a prescribed amount of compressed image data to be displayed in one stage of said plurality of stages;

(d) reading the compressed image data from said temporary storing step, and then subjecting the compressed and read image data to data expansion processing;

(e) counting the amount of compressed image data read from said temporary storing step;

(f) comparing the amount of compressed image data counted in step (e) above with said prescribed amount of compressed image data to be displayed in said one stage of said plurality of stages, and for outputting a coincidence signal when the count amount reaches said prescribed amount to stop said image data expanding from said data expansion processing; and (g) in response to said coincidence signal, reproducing the image data expanded in step (d) above, into a video signal in a form suitable for displaying, and for outputting the video signal in a plurality of stages.

* * * * *